(12) United States Patent
Burke et al.

(10) Patent No.: US 10,318,836 B2
(45) Date of Patent: Jun. 11, 2019

(54) SYSTEM AND METHOD FOR DESIGNATING SURVEILLANCE CAMERA REGIONS OF INTEREST

(71) Applicant: Sensormatic Electronics, LLC, Boca Raton, FL (US)

(72) Inventors: Anthony Burke, Noblesville, IN (US); Peter Joseph Birkel, Noblesville, IN (US); Scott Humphreys, Indianapolis, IN (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 177 days.

(21) Appl. No.: 15/076,704

(22) Filed: Mar. 22, 2016

(65) Prior Publication Data

US 2017/0277967 A1 Sep. 28, 2017

(51) Int. Cl.
*G06K 9/32* (2006.01)
*G06K 9/00* (2006.01)

(52) U.S. Cl.
CPC ....... *G06K 9/3241* (2013.01); *G06K 9/00771* (2013.01); *G06K 2009/3291* (2013.01)

(58) Field of Classification Search
CPC ....... G06K 9/00771; G06K 2009/3291; G06K 9/00362; G06K 9/0063; G06K 9/3241;
(Continued)

(56) References Cited

U.S. PATENT DOCUMENTS 3,217,098 A * 11/1965 Oswald ................. H04N 7/181
346/107.2

4,940,925 A * 7/1990 Wand ................... G05D 1/0246
318/580
(Continued)

FOREIGN PATENT DOCUMENTS

EP 2 164 003 A1 3/2010
EP 2 538 672 A1 12/2012
(Continued)

OTHER PUBLICATIONS

International Search Report and the Written Opinion of the International Searching Authority, dated May 31, 2017, from International Application No. PCT/US2017/023430, filed Mar. 21, 2017. Fourteen pages.
(Continued)

*Primary Examiner* — Manav Seth
(74) *Attorney, Agent, or Firm* — HoustonHogle LLP (57) ABSTRACT

A system and method of designating regions of interest for surveillance cameras is disclosed. The system enables definition of regions of interest simultaneously across multiple cameras. This is useful when the cameras are positioned to monitor the same region of interest within their scenes. Each camera monitors image data for designation of regions of interest, stores the regions of interest, and analyzes the image data from the cameras based on the regions of interest. Preferably, each camera has an integrated analytics system for analyzing the image data based on the regions of interest. A setup process between a user device (e.g. mobile phone) and the cameras enables definition of the regions of interest. In embodiments, the regions of interest are defined in response to the cameras tracking either the user device or an optical device as an operator moves the devices to outline the regions of interest within the scene.

16 Claims, 8 Drawing Sheets

(58) Field of Classification Search
CPC ........... G06K 9/00201; G06K 2209/21; G06K 9/00664; G06K 9/3233; G06T 7/246; G06T 7/70; G06Q 10/04; G06Q 10/0833
See application file for complete search history.

(56) References Cited

U.S. PATENT DOCUMENTS

| | | | | |
|---|---|---|---|---|
| 5,164,827 | A * | 11/1992 | Paff | G08B 13/19608 348/143 |
| 5,204,536 | A * | 4/1993 | Vardi | B60T 7/22 250/551 |
| 5,317,394 | A * | 5/1994 | Hale | H04N 7/181 348/147 |
| 5,729,471 | A * | 3/1998 | Jain | G06T 15/10 345/419 |
| 5,850,352 | A * | 12/1998 | Moezzi | H04N 13/139 345/419 |
| 5,940,538 | A * | 8/1999 | Spiegel | G06T 7/246 345/473 |
| 5,969,755 | A * | 10/1999 | Courtney | G06F 17/3079 348/135 |
| 6,341,183 | B1 * | 1/2002 | Goldberg | G06F 3/005 382/276 |
| 6,359,647 | B1 * | 3/2002 | Sengupta | G08B 13/19608 348/154 |
| 6,581,000 | B2 * | 6/2003 | Hills | G01C 21/12 340/988 |
| 6,724,421 | B1 * | 4/2004 | Glatt | G08B 13/19608 348/143 |
| 6,812,835 | B2 * | 11/2004 | Ito | G08B 13/19604 340/541 |
| 6,970,083 | B2 * | 11/2005 | Venetianer | G06K 9/00778 340/541 |
| 7,091,949 | B2 * | 8/2006 | Hansen | G06F 3/0386 345/157 |
| 7,242,423 | B2 | 7/2007 | Lin | |
| 7,286,157 | B2 | 10/2007 | Buehler | |
| 7,342,489 | B1 * | 3/2008 | Milinusic | G08B 13/19604 340/506 |
| 7,382,244 | B1 | 6/2008 | Donovan et al. | |
| 7,409,076 | B2 * | 8/2008 | Brown | G06K 9/00778 348/169 |
| 7,450,735 | B1 | 11/2008 | Shah et al. | |
| 7,456,596 | B2 | 11/2008 | Goodall et al. | |
| 7,460,149 | B1 | 12/2008 | Donovan et al. | |
| 7,529,388 | B2 * | 5/2009 | Brown | G06K 9/00778 348/169 |
| 7,623,152 | B1 | 11/2009 | Kaplinsky | |
| 7,623,676 | B2 * | 11/2009 | Zhao | G06K 9/00369 348/580 |
| 7,733,375 | B2 * | 6/2010 | Mahowald | H04N 1/00002 348/207.99 |
| 8,249,301 | B2 * | 8/2012 | Brown | G06K 9/00369 348/169 |
| 8,300,102 | B2 | 10/2012 | Nam et al. | |
| 8,325,979 | B2 * | 12/2012 | Taborowski | G01C 21/32 382/103 |
| 8,482,609 | B1 * | 7/2013 | Mishra | H04N 7/181 348/143 |
| 8,483,490 | B2 * | 7/2013 | Brown | G06K 9/00369 382/103 |
| 8,502,868 | B2 * | 8/2013 | Buehler | G08B 13/19693 348/143 |
| 8,594,482 | B2 * | 11/2013 | Fan | G08B 13/196 386/200 |
| 8,675,074 | B2 * | 3/2014 | Salgar | H04N 7/181 348/143 |
| 8,723,952 | B1 | 5/2014 | Rozenboim | |
| 8,995,712 | B2 * | 3/2015 | Huang | G06K 9/00771 348/135 |
| 9,015,167 | B1 | 4/2015 | Ballou et al. | |
| 9,058,520 | B2 * | 6/2015 | Xie | G06K 9/00624 |
| 9,094,615 | B2 * | 7/2015 | Aman | G01S 3/7864 |
| 9,129,179 | B1 | 9/2015 | Wong | |
| 9,158,975 | B2 * | 10/2015 | Lipton | G06K 9/00771 |
| 9,168,882 | B1 | 10/2015 | Mirza et al. | |
| 9,197,861 | B2 * | 11/2015 | Saptharishi | H04N 7/18 |
| 9,280,833 | B2 | 3/2016 | Brown et al. | |
| 9,412,269 | B2 * | 8/2016 | Saptharishi | G08G 1/0133 |
| 9,495,614 | B1 | 11/2016 | Boman et al. | |
| 9,594,963 | B2 * | 3/2017 | Bobbitt | G06K 9/00718 |
| 9,641,763 | B2 * | 5/2017 | Bernal | H04N 5/23296 |
| 9,674,458 | B2 | 6/2017 | Teich et al. | |
| 9,785,898 | B2 | 10/2017 | Hofman et al. | |
| 9,860,554 | B2 * | 1/2018 | Samuelsson | H04N 19/527 |
| 9,965,680 | B2 | 5/2018 | Burke et al. | |
| 9,967,446 | B2 * | 5/2018 | Park | H04N 5/23203 |
| 2002/0104098 | A1 | 8/2002 | Zustak et al. | |
| 2003/0107649 | A1 * | 6/2003 | Flickner | G06K 9/00362 348/150 |
| 2003/0169337 | A1 | 9/2003 | Wilson et al. | |
| 2005/0012817 | A1 | 1/2005 | Hampapur et al. | |
| 2005/0057653 | A1 | 3/2005 | Maruya | |
| 2006/0001742 | A1 | 1/2006 | Park | |
| 2006/0181612 | A1 | 8/2006 | Lee et al. | |
| 2006/0239645 | A1 * | 10/2006 | Curtner | G06F 17/3079 386/228 |
| 2006/0243798 | A1 * | 11/2006 | Kundu | G06Q 20/00 235/383 |
| 2007/0178823 | A1 | 8/2007 | Aronstam et al. | |
| 2007/0279494 | A1 * | 12/2007 | Aman | G01S 3/7864 348/169 |
| 2007/0294207 | A1 | 12/2007 | Brown et al. | |
| 2008/0004036 | A1 | 1/2008 | Bhuta et al. | |
| 2008/0101789 | A1 | 5/2008 | Sharma | |
| 2008/0114477 | A1 | 5/2008 | Wu | |
| 2008/0158336 | A1 | 7/2008 | Benson et al. | |
| 2009/0237508 | A1 * | 9/2009 | Arpa | G06T 15/205 348/153 |
| 2009/0268033 | A1 | 10/2009 | Ukita | |
| 2009/0273663 | A1 | 11/2009 | Yoshida | |
| 2009/0284601 | A1 | 11/2009 | Eledath et al. | |
| 2010/0013917 | A1 * | 1/2010 | Hanna | G06K 9/00771 348/143 |
| 2010/0110212 | A1 | 5/2010 | Kuwahara et al. | |
| 2010/0153182 | A1 | 7/2010 | Quinn et al. | |
| 2011/0043631 | A1 * | 2/2011 | Marman | H04N 5/772 348/143 |
| 2011/0128384 | A1 | 6/2011 | Tiscareno et al. | |
| 2011/0246626 | A1 | 10/2011 | Peterson et al. | |
| 2012/0072420 | A1 | 3/2012 | Moganti et al. | |
| 2012/0206605 | A1 | 8/2012 | Buehler et al. | |
| 2012/0226526 | A1 | 9/2012 | Donovan et al. | |
| 2013/0169801 | A1 | 7/2013 | Martin et al. | |
| 2013/0223625 | A1 | 8/2013 | de Waal et al. | |
| 2013/0278780 | A1 | 10/2013 | Cazier et al. | |
| 2013/0343731 | A1 | 12/2013 | Pashkevich et al. | |
| 2014/0085480 | A1 | 3/2014 | Saptharishi | |
| 2014/0211018 | A1 | 7/2014 | de Lima et al. | |
| 2014/0218520 | A1 | 8/2014 | Teich et al. | |
| 2014/0330729 | A1 | 11/2014 | Colangelo | |
| 2015/0039458 | A1 | 2/2015 | Reid | |
| 2015/0092052 | A1 | 4/2015 | Shin et al. | |
| 2015/0121470 | A1 | 4/2015 | Rongo et al. | |
| 2015/0208040 | A1 | 7/2015 | Chen et al. | |
| 2015/0215583 | A1 | 7/2015 | Chang | |
| 2015/0244992 | A1 | 8/2015 | Buehler | |
| 2015/0249496 | A1 | 9/2015 | Muijs et al. | |
| 2015/0358576 | A1 | 12/2015 | Hirose et al. | |
| 2015/0379729 | A1 | 12/2015 | Datta et al. | |
| 2016/0065615 | A1 | 3/2016 | Scanzano et al. | |
| 2016/0269631 | A1 * | 9/2016 | Jiang | H04N 5/23238 |
| 2016/0379074 | A1 | 12/2016 | Nielsen et al. | |
| 2017/0193673 | A1 * | 7/2017 | Heidemann | G01B 11/2513 |
| 2017/0277785 | A1 | 9/2017 | Burke | |
| 2017/0277947 | A1 | 9/2017 | Burke et al. | |
| 2017/0278137 | A1 | 9/2017 | Burke | |
| 2017/0278365 | A1 * | 9/2017 | Madar | G06K 7/1092 |
| 2017/0278366 | A1 | 9/2017 | Burke et al. | |
| 2017/0278367 | A1 * | 9/2017 | Burke | G06T 7/2093 |
| 2017/0278368 | A1 * | 9/2017 | Burke | G08B 13/19656 |
| 2017/0280043 | A1 * | 9/2017 | Burke | H04N 5/23206 |

(56) References Cited

U.S. PATENT DOCUMENTS

| | | | |
|---|---|---|---|
| 2017/0280102 A1* | 9/2017 | Burke | H04N 7/181 |
| 2017/0280103 A1* | 9/2017 | Burke | H04N 7/181 |
| 2018/0218209 A1 | 8/2018 | Burke et al. | |

FOREIGN PATENT DOCUMENTS

| | | |
|---|---|---|
| JP | 2003/151048 A | 5/2003 |
| JP | 2010/074382 A | 4/2010 |
| WO | 2007/030168 A1 | 3/2007 |
| WO | 2013/141742 A1 | 9/2013 |
| WO | 2014/114754 A1 | 7/2014 |

OTHER PUBLICATIONS

International Search Report and the Written Opinion of the International Searching Authority, dated Jun. 12, 2017, from International Application No. PCT/US2017/023440, filed on Mar. 21, 2017. Fourteen pages.

International Search Report and the Written Opinion of the International Searching Authority, dated Jun. 19, 2017, from International Application No. PCT/US2017/023436, filed on Mar. 21, 2017. Fourteen pages.

International Search Report and the Written Opinion of the International Searching Authority, dated Jun. 21, 2017, from International Application No. PCT/US2017/023444, filed on Mar. 2, 2017. Thirteen pages.

International Search Report and the Written Opinion of the International Searching Authority, dated Jun. 28, 2017, from International Application No. PCT/US2017/023434, filed on Mar. 21, 2017. Thirteen pages.

International Preliminary Report on Patentability, dated Oct. 4, 2018, from International Application No. PCT/US2017/023440, filed on Mar. 21, 2017. Eight pages.

International Preliminary Report on Patentability, dated Oct. 4, 2018, from International Application No. PCT/US2017/023434, filed on Mar. 21, 2017. Eight pages.

International Preliminary Report on Patentability, dated Oct. 4, 2018, from International Application No. PCT/US2017/023430, filed Mar. 21, 2017. Eight pages.

International Preliminary Report on Patentability, dated Oct. 4, 2018, from International Application No. PCT/US2017/023436, filed on Mar. 21, 2017. Eight pages.

International Preliminary Report on Patentability, dated Oct. 4, 2018, from International Application No. PCT/US2017/023444, filed on Mar. 21, 2017. Seven pages.

* cited by examiner

SYSTEM AND METHOD FOR DESIGNATING SURVEILLANCE CAMERA REGIONS OF INTEREST

RELATED APPLICATIONS

This application is related to:

U.S. application Ser. No. 15/076,701 filed on Mar. 22, 2016, entitled "Method and system for surveillance camera arbitration of uplink consumption," now U.S. Patent Publication No.: 2017/0278368A1;

U.S. application Ser. No. 15/076,703 filed on Mar. 22, 2016, entitled "Method and system for pooled local storage by surveillance cameras," now U.S. Patent Publication No.: 2017/0280102 A1;

U.S. application Ser. No. 15/076,705 filed on Mar. 22, 2016, entitled "System and method for deadzone detection in surveillance camera network," now U.S. Patent Publication No.: 2017/0278366 A1;

U.S. application Ser. No. 15/076,706 filed on Mar. 22, 2016, entitled "System and method for overlap detection in surveillance camera network," now U.S. Patent Publication No.: 2017/0278367 A1;

U.S. application Ser. No. 15/076,708 filed on Mar. 22, 2016, entitled "System and method for retail customer tracking in surveillance camera network," now U.S. Patent Publication No.: 2017/0278137 A1;

U.S. application Ser. No. 15/076,709 filed on Mar. 22, 2016, entitled "Method and system for modeling image of interest to users," now U.S. Patent Publication No.: 2017/0277785 A1;

U.S. application Ser. No. 15/076,710 filed on Mar. 22, 2016, entitled "System and method for using mobile device of zone and correlated motion detection," now U.S. Patent Publication No.: 2017/0280103 A1;

U.S. application Ser. No. 15/076,712 filed on Mar. 22, 2016, entitled "Method and system for conveying data from monitored scene via surveillance cameras," now U.S. Patent No.: 9,965,680;

U.S. application Ser. No. 15/076,713 filed on Mar. 22, 2016, entitled "System and method for configuring surveillance cameras using mobile computing devices," now U.S. Patent Publication No.: 2017/0278365 A1; and U.S. application Ser. No. 15/076,717 filed on Mar. 22, 2016, entitled "System and method for controlling surveillance cameras," now U.S. Patent Publication No.: 2017/0280043 A1.

All of the afore-mentioned applications are incorporated herein by this reference in their entirety.

BACKGROUND OF THE INVENTION

Analytics systems have the capability to automatically analyze image data from surveillance cameras. Often, the analytics systems will track moving objects against fixed background models. More sophisticated functions include object detection to determine the presence of an object or a type of the object. Even higher level functions include object analysis and recognizing temporal and spatial events associated with the image data. The analytics systems generate video primitives or metadata for the detected objects and determined events, which the analytics systems can further process or send over the data networks to other systems for storage and incorporation into the image data as metadata, for example. These objects of interest are described via a set of "video primitives," which may be a text description of some or all of the objects and observable features within a video. These video primitives also may include descriptions of the objects, their locations, velocities, shape, colors, location of body parts, etc.

While analytics systems have historically been separate systems apart from the surveillance cameras, the surveillance cameras themselves are increasingly providing this functionality. Integrating the analytics functionality within the cameras themselves has advantages. It eliminates the cost and maintenance associated with deploying a separate analytics system to accomplish the same objective, and enables more efficient analysis by eliminating the messaging overhead associated with sending the image data over the data network for analysis by the separate analytics systems.

It is often required to train or configure these analytics systems to process the image data. Regions of interest such as points, lines and/or areas within the image data can function as virtual tripwires or other bases for analysis of the image data. For example, there might be regions of interest associated with the threshold of a door or point of sale terminal or a portion where customer would form a queue. When the analytics systems detect that objects within the image data have crossed, entered, left, and/or overlapped with regions of interest, the analytics systems generate video primitives in response. The video primitives might be associated with security events or other events of interest that operators of the surveillance camera systems want to identify.

Operators configure the analytics systems by using a separate computer system. Operators typically utilize a graphical user interface (GUI) application of the separate computer system that might provide a graphical drawing tool. The operator can iteratively "draw" the regions of interest upon the displayed scenes from the cameras's fields of view. The operator then sends defined regions of interest to the analytics systems to be used in the image data analysis, and repeats this process for each of the surveillance cameras.

SUMMARY OF THE INVENTION

A couple of issues can be noted with these existing systems. First, the analytics systems can require a separate computer system on which the operators observe and highlight important aspects of the scenes as part of the configuration of the video analytics systems, i.e., to define the regions of interest such as tripwires and other regions, points or lines within the scenes captured by the cameras. Moreover, defining the regions of interest must be repeated for each surveillance camera. This is an important consideration, because many times multiple cameras are oriented to monitor the same region of interest by overlapping their fields of view. Such an application provides the operators with different views of the same region of interest across the cameras. For example, it is often useful to position the fields of view of an overhead camera and a wall mounted camera to include a region of interest that surrounds the same cash register in a point of sale area. The overhead camera and the wall mounted camera each provide a different view or perspective of activities occurring near or within the common region of interest surrounding the cash register. Though the intended region of interest is the same across both cameras, the operator must define the region of interest separately for the overhead camera and the wall camera to accomplish this objective due to the different fields of view of the cameras.

In general, according to one aspect, the invention features a method of designating regions of interest in the fields of view of surveillance cameras. The method comprises capturing image data with the surveillance cameras and analyzing the image data for designation of regions of interest.

In one example, the designation of the regions of interest comprises tracking a portable computing device as it is moved with respect to desired regions of interest to thereby define the regions of interest. The portable computing device can be controlled to display images during the defining of the regions of interest.

In another example, the designation of the regions of interest comprises tracking a light spot projected into fields of view of the surveillance cameras as it is moved to thereby define the regions of interest.

The analytics system can then utilize the designated regions of interest to analyze the image data from the surveillance cameras. For example, metadata for the image data can be generated in response to detecting events relative to the regions and/or the predetermined optical patterns. More specific examples include tracking movement of objects or persons relative to 1) point of sale terminals or 2) product displays and/or 3) thresholds of doors or 4) along streets or hallways that are identified by the regions.

Depending on the embodiment, the analytics systems can be embedded in the surveillance cameras external analytics systems and/or analytics systems executing on a portable computing device to determine the designated regions of interest.

In general, according to another aspect, the invention features a surveillance camera system. The system comprises one or more surveillance cameras capturing image data and an analytics system analyzing the image data for designation of regions of interest.

In general, according to another aspect, the invention features method of analyzing image data from a surveillance camera. The method comprises installing mechanisms for generating predetermined optical patterns in response to events of interest in a scene monitored by the surveillance camera, monitoring image data for the predetermined optical patterns, and generating metadata for the image data in response to detecting the predetermined optical patterns.

In general, according to another aspect, the invention features a system for analyzing image data. The system comprises mechanisms for generating predetermined optical patterns in response to events of interest a surveillance camera capturing image data including the optical patterns, and an analytics system for analyzing the image data for the predetermined optical patterns and generating metadata for the image data in response to detecting or not detecting the predetermined optical patterns.

In general, according to another aspect, the invention features a method of designating regions of interest in the fields of view of surveillance cameras. The method comprises capturing image data with the surveillance cameras wherein the fields of view of the cameras are overlapping and analyzing the image data for designation of the same regions of interest in each of the different fields for the different cameras simultaneously.

In general, according to yet another aspect, the invention features a surveillance camera system. The system comprises surveillance cameras capturing image data and having overlapping fields of view and an analytics system analyzing the image data from the surveillance cameras for designation of regions of interest.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
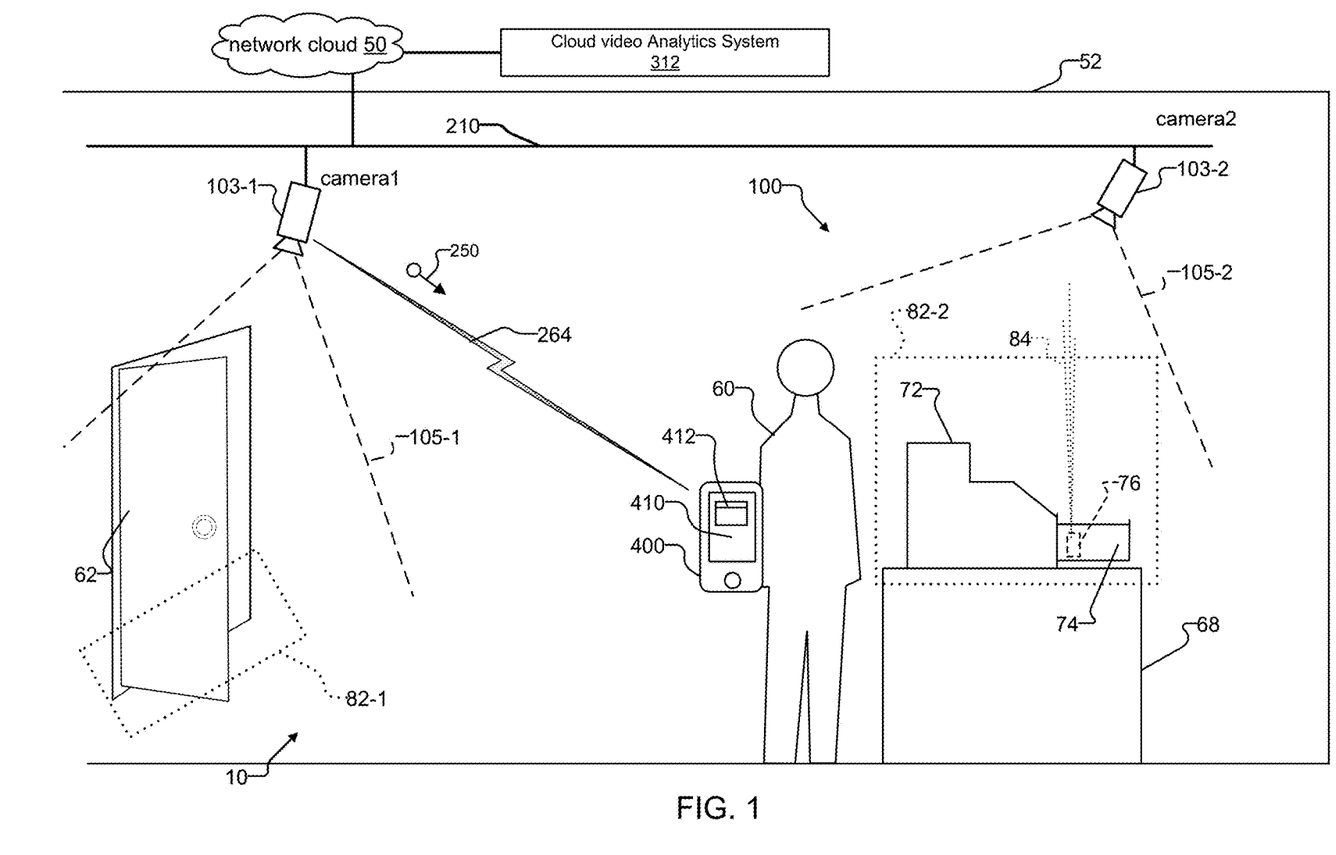
FIG. 1 is a schematic diagram showing a network or system of surveillance cameras installed at a client premises and a user device for accessing image data from the surveillance cameras as part of a setup process.

FIG. 1 shows an exemplary surveillance camera system 10 to which the present invention is applicable.

The system 10 includes surveillance cameras 103 and other components installed at a premises 52. The surveillance cameras 103-1/103-2 generate image data 250 of scenes corresponding to their respective fields of view 105-1/105-2 and communicate with each other and with other security devices over a local network 210. The local network 210 may be wired, wireless, or a hybrid of wired and wireless links.

Another component of the system 10 is a video analytics system 312 that the surveillance cameras 103 access via a network cloud 50. The video analytics system 312 is typically managed by a third party hosting company and is presented to the enterprise local network 210 as a single virtual entity, in one example. In other examples, the analytics system is installed on the local network 210 and may be owned by the same business entity as the surveillance camera system 10.

Operators 60 holding user mobile computing devices 400, also known as user devices, communicate with the surveillance cameras 103 and/or the analytics system 312. The user devices 400 exchange messages 264 between each surveillance camera 103 and/or the analytics system 312 for this purpose. Examples of user devices 400 include smartphones, tablet computing devices, and laptop computers. These devices might run operating systems such as Windows, Android, Linux, or 108, in examples. Each user device 400 includes a display screen 410 and one or more applications 412, or "apps." The apps 412 execute upon the operating systems of the user devices 400.

The wireless messages 264 enable the user devices 400 to access the image data 250 on the surveillance cameras 103 and to configure regions of interest 82 for the surveillance cameras 103. The wireless messages 264 include both control and data wireless messages in one example, data wireless messages 264 include frames of image data 250 that the surveillance cameras 103 send to the user mobile computing devices 400.

A specific example showing how the cameras 103 might be deployed is illustrated. In the example, camera1 103-1 is focused upon a door 62 located within an aisle 70 or entryway to the premises 52. The field of view 105-1 of camera1 103-1 includes the door 62 and region of interest 82-1 (threshold of door 62) for analyzing movement of objects near a threshold of the door 62

Camera2 is positioned to monitor a different area within the premises 52 than camera1 103-1. Camera2 103-2 is focused upon a point of sale area 100. The point of sale area 100 includes a cash register or point of sale terminal 72 located on top of a desk 68. LED light 76 included within a drawer 74 of the point of sale terminal 72 emits a light beam 84 when the drawer 74 is opened. The field of view 105-2 of camera2 103-2 includes the operator 60 and the user device 400, the point of sale terminal 72, and region of interest 82-2. Region of interest 82-2 surrounds the point of sale terminal 72. In other examples, the region of interest might correspond to region where customers stand in a queue for the point of sale terminal, or a product isle or hallway or specific display case, to give a few examples. Further, the region of interest might further correspond to a position of the LED light source 74 when the drawer 76 is in an open position.

Figure 2:
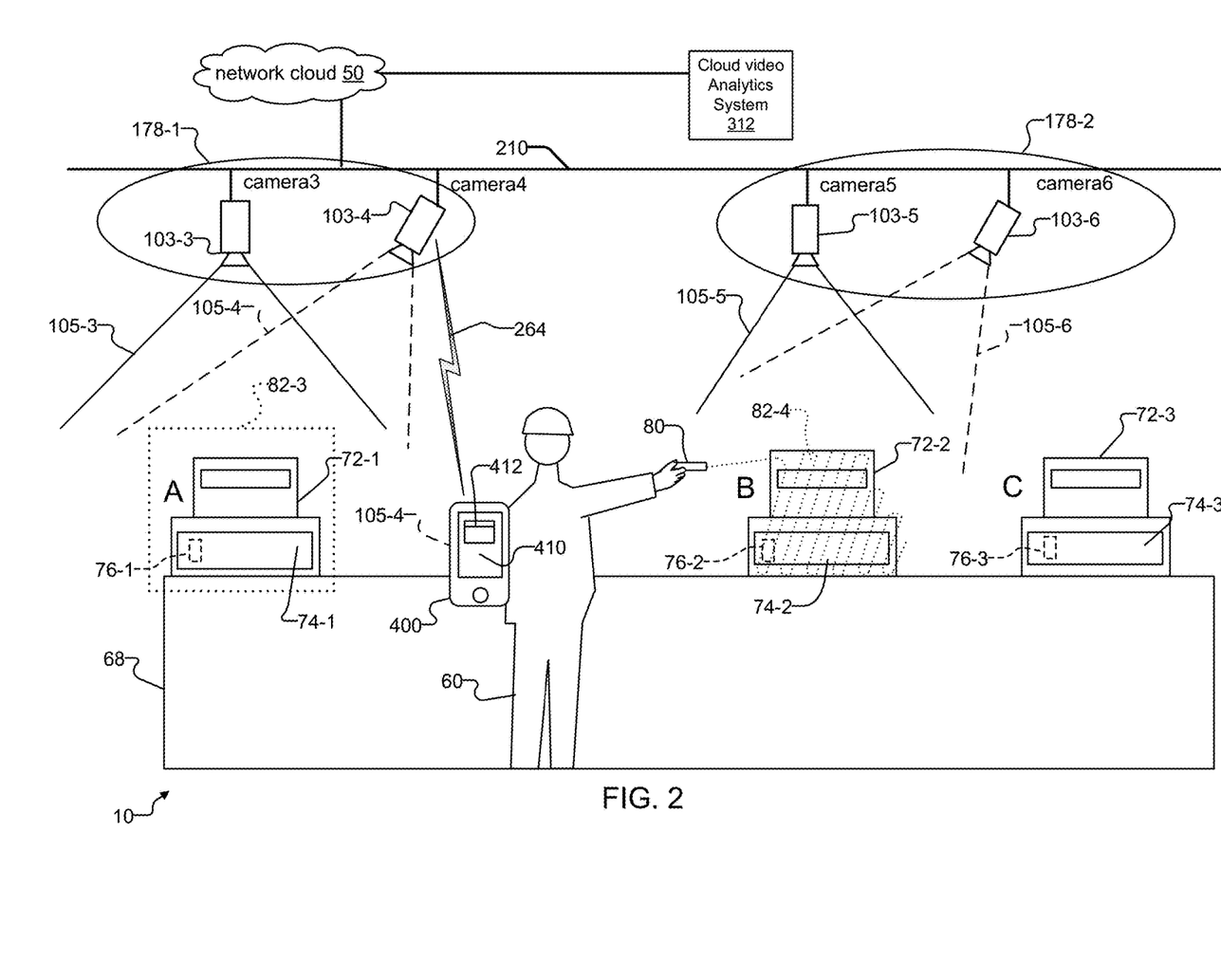
FIG. 2 is a schematic diagram showing four exemplary surveillance cameras that each capture image data of scenes at a customer premises, where two pairs of the cameras each focus on different point of sale terminals, and where an installer utilizes a user mobile computing device to define regions of interest for the first pair of surveillance cameras and utilizes a laser pointer in conjunction with the user mobile computing device to define regions of interest for the second pair of surveillance cameras, as part of a setup process.

FIG. 2 shows another exemplary surveillance camera system 10 to which the present invention is applicable. The system 10 includes four surveillance cameras, camera3 103-3 through camera6 103-6, and point of sale terminals 72-1 through 72-3 labeled A, B, and C. Each of the terminals 72-1 through 72-3 includes a drawer 74-1 through 74-3, respectively. Each drawer 74-1 through 74-3 includes an LED light 76-1 through 76-3, respectively.

A specific example showing how the cameras 103 might be deployed is illustrated. Camera3 103-3 and camera4 103-4 form a first pair 178-1 of cameras, while camera5 103-5 and camera6 103-6 form a second pair 178-2 of cameras 103. Each of the pairs 178 focuses upon an area of the premises 52 that includes a different point of sale terminal 72.

For the first pair 178-1, the fields of view of 105-3/150-4 of camera3 103-3 and camera.4 103-4 overlap, including point of sale terminal A 72-1 and region of interest 82-3 that surrounds point of sale terminal A 72-1. For the second pair 178-2, the fields of view of 105-5 /150-6 of camera5 103-5 and camera6 103-6 include point of sale terminal B 72-2 and region of interest 82-4 that surrounds point of sale terminal B 72-2.

In a first embodiment, with respect to the illustrated example, the operator 60 designates a region of interest 82-3 across the cameras 103-3 and 103-4 of pair 178-1 using a setup process between the user device 400 and the cameras 103-3 and 103-4. During the setup process, the user device 400 enables the definition of the same region of interest 82-3 for camera3 103-3 and camera4 103-4 of pair 178-1. The surveillance cameras 103-3 and 103-4 participating in the setup process track the user device 400 using integrated image data analytics systems or the external analytics system 312 or even an analytics system executing on the user device 400 as the operator 60 moves the user device 400 within the scene and their respective fields of view.

The operator 60 initiates the setup process between the user device 400 and the surveillance cameras and/or the external analytics system 312 via messages 264 exchanged between the app 412 of the user device 400 and each of the cameras 103-3/103-4 and/or the external analytics system 312. The operator 60 moves the user device 400 within the scene in a manner that traces or outlines or fills-in the desired region of interest 82-3. During this process, the app 412 preferably displays a predetermined sequence of images on the display 410 of the user mobile computing device 400. Cameras 103-3 and 103-4 detect the predetermined sequence of images. One or more analytics system e.g., external (local or remote) analytic system 312, analytics systems integrated on the surveillance cameras 103, and/or an analytics system executing on the user device 400 interpret the sequence of images, and render an electronic version of the region of interest 82 in response. Each camera 103-3 and 103-4 or other of the analytics systems then saves the electronic version of the region of interest 82 within local storage of each camera 103 and/or in a setup file containing the definitions of the regions of interest in the analytics system 312 for each of the cameras, for example.

In a second embodiment, also with respect to the illustrated example, the operator 60 designates a region of interest 82-4 across the cameras 103-5 and 103-6 of pair 178-2 using a setup process between the user device 400 and the cameras 103-5 and 103-6, in conjunction with a laser or similar optical pointing device 80. Moreover, the setup process can be performed for multiple cameras simultaneously.

During the setup process, the user device 400 enables the definition of the same region of interest 82-4 for camera5 103-5 and camera6 103-6 of pair 178-1. In contrast to the first embodiment of the setup process, however, the surveillance cameras 103-5 and 103-6 participating in the setup process track a beam of light emitted from the laser pointer device 80.

As in the first embodiment, the app 412 initiates the setup process between the user device 400 and the surveillance cameras via messages 264 exchanged between the app 412 of the user device 400 and each of the cameras 103-5/103-6 of pair 178-2 and/or the analytics system 312. Then, the operator 60 moves the laser pointer device 80 within the scene such that the light emitted from the laser pointer device 80 is projected onto and traces or outlines the desired region of interest 82-4. In another example, the operator 60 can outline the region of interest 82-4 by directing the light shone by the laser pointer device 80 to "paint" portions of an object within the scene with light. With respect to the illustrated example, the operator 60 moves the laser pointer device 80 to direct its emitted light in a scanned fashion upon point of sale terminal B 72-2 to thereby designate a point of sale terminal region of interest for the analytics system 312.

In response to each of the cameras 103-5 and 103-6 detecting the pattern of light within the scene, analytics system in each of the cameras 103-5 and 103-6 or independent analytics systems 312 and/or analytic systems executing on the device 400 analyze the image data for designation of regions of interest and then renders and saves an electronic version of the region of interest 82-4 within local storage of each camera 103-5 and 103-6 or the other analytics systems and/or send the coordinates of the region of interest 82-4 within the image data to the analytics system 312.

It is important to note that the designation of the regions of interest 82 across the cameras 102 provided by the system 10 does not require any specific positioning of the cameras 103 in advance nor requires an installer to specify a degree of overlap among the fields of view 105 of the cameras 103 in advance. This is because an analytics system preferably analyzes the image data 250 from the cameras 103 to determine any designated regions of interest 82. Moreover, the analytics system in one embodiment generates metadata associated with each pair of surveillance cameras 178-1, 178-2 specifying the degree of overlap of their fields of view. This metadata is generated by the analytics systems by analyzing the movement of the spot from the laser pointer 80 or the user device 400 and when the spot or user device is simultaneously within the fields of both cameras.

Figure 3:
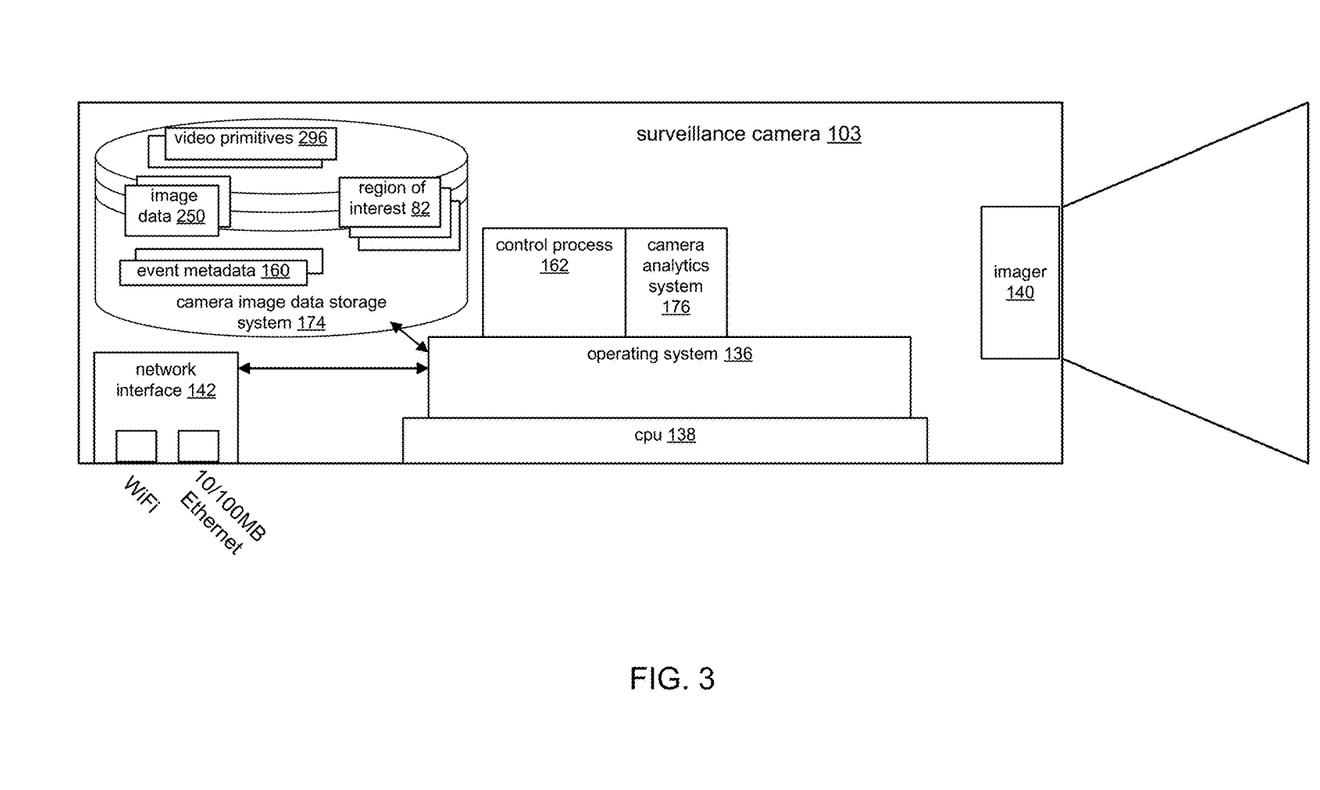
FIG. 3 is a schematic diagram showing some of the components of the surveillance cameras according to an embodiment.

FIG. 3 shows some of the components of an exemplary surveillance camera 103 that includes an integrated analytics system 176 as discussed above.

The camera 103 includes a processing unit (CPU) 138, an imager 140, a camera image data storage system 174 and a network interface 142. An operating system 136 runs on top of the CPU 138. A number of processes or applications are executed by the operating system 136. The processes include a control process 162 and a camera analytics system 176.

The camera 103 saves image data 250 captured by the imager 140 to the camera image data storage system 174 in one example. Each camera 103 can support one or more streams of image data 250. The control process 162 receives and sends messages 264 via its network interface 142. Upon conclusion of the setup processes of the disclosed embodiments, the camera 103 renders and saves an electronic version of the region of interest 82 to its camera image data storage system 174. Each camera 103 also saves event metadata 160. Note that more than one region of interest 82 can be defined for each camera 103.

During the setup process of the disclosed embodiments, after the regions of interest 82 are defined, the control process 162 sends the regions of interest 82 along with the image data to the integrated camera analytics system 176 for analysis in some cases. The camera analytics system 176 analyzes the image data 250 based on the regions of interest 82. The camera analytics system 176 generates meta data and video primitives 296 in response to the analysis, and stores the video primitives 296 to the camera image data storage system 174.

In some cases, the camera 103 may also or alternatively stream image data to the user device 400 or the external analytics system 312 and these analytics systems analyze the image data to detect the designation of the regions of interest.

Figure 4:
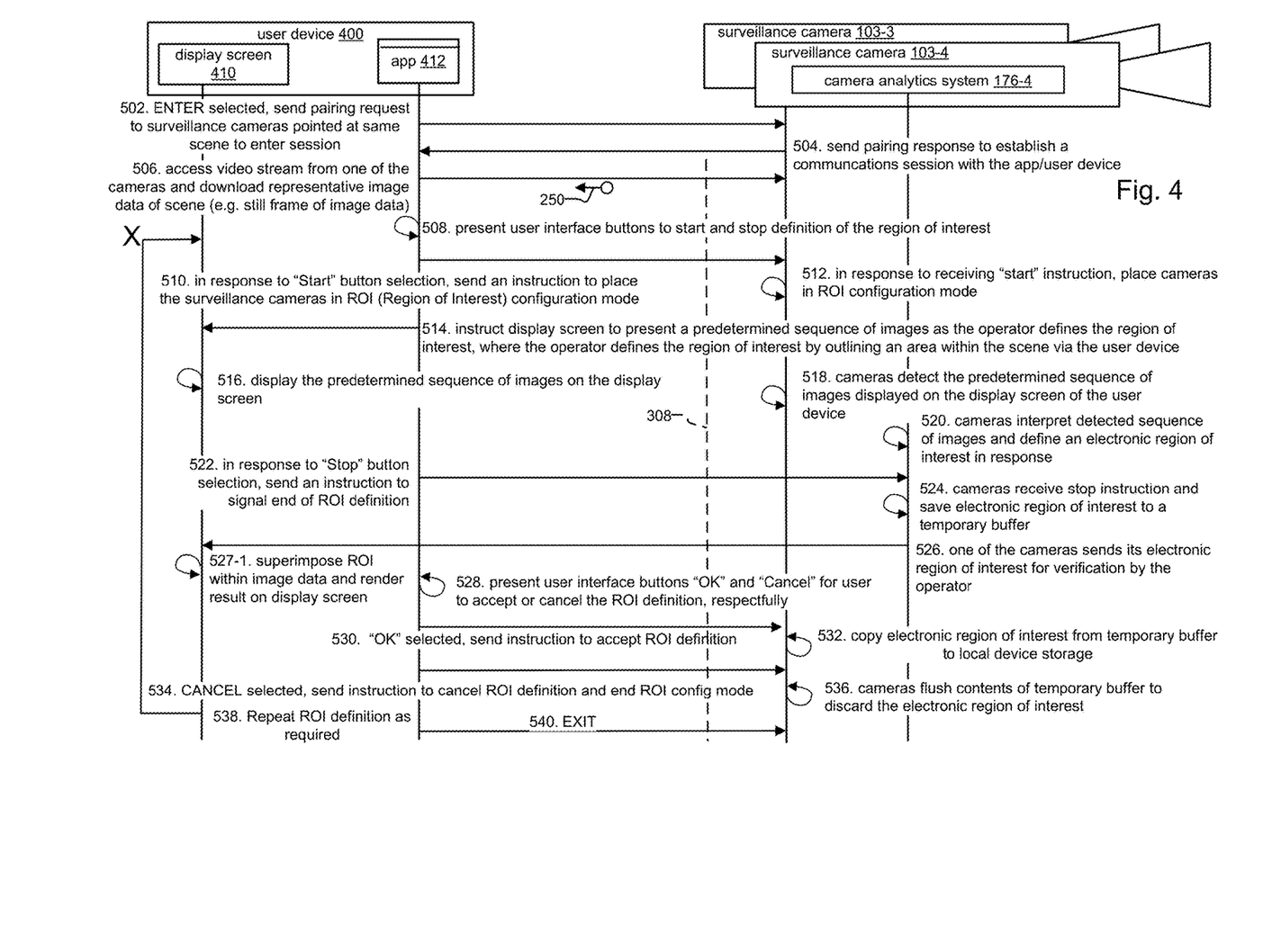
FIG. 4 is a sequence diagram that describes a first embodiment of a setup process enabling an installer to designate regions of interest and to do so across multiple surveillance cameras simultaneously that have overlapping fields of view, via a user device.

FIG. 4 is a sequence diagram that describes a first embodiment of a setup process that enables an installer to simultaneously designate regions of interest 82 and also possibly designate the regions across multiple surveillance cameras 103 simultaneously. The setup process utilizes a user device 400 to trace the regions of interest 82 within the scene.

In step 502, an operator selects ENTER button 141-5 within the app 412 of user device 400 to direct the cameras 103 to begin a communication session 308 with the app 412. In response to selection of the ENTER button 141-5, the app 412 sends a pairing request message to one or more surveillance cameras 103 pointed at same scene. The cameras 103 and the app 412 exchange messages 264 using standard communications protocols such as those based on Internet Protocol (IP), but propriety protocols can also be used. Typically, the operators configure the pairing request message to include the destination addresses of each surveillance camera 103 participating in the configuration process. According to step 504, each camera 103 receiving the message 264 sends a pairing response message, the result of which establishes a two-way communications session 308 between each of the cameras 103 and the app 412 excutign on the user device.

In step 506, the app 412 accesses a video stream from one of the cameras 103 and downloads representative image data 250 of the scene (e.g. a still frame of image data 250). In step 508, the app 412 presents user interface buttons 414-1 and 414-2 to start and stop definition of the region of interest 82 for the cameras 103. In response to selection of the "Start" button 414-1, the app 412 sends an instruction to place the surveillance cameras 103 and/or the analytics systems in a Region of Interest (ROI) configuration mode, according to step 510. In step 512, in response to receiving the "start" instruction, each camera 103 places itself in ROI configuration mode.

Then, in step 514, the app 412 instructs the display screen 410 of the user device 400 to present a predetermined image or sequence of images as the operator 60 defines the region of interest 82, where the operator defines the region of interest 82 by outlining an area within the scene via the user device 400. The app 412 displays the predetermined sequence of images on the display screen 410 of the user device 400 in step 516 as the operator moves the device through space so that the user device is located in front of the region of interested from the perspective of the one or more surveillance cameras.

According to step 518, each of the cameras 103 captures the image data from their fields of view. The one or more analytics systems then detect the predetermined sequence of images displayed on the display screen 410 of the user device 400 within the camera's field of view. In one example, the images are a series of alternating test pattern images which integrated camera analytics systems 176 of the cameras 103 or the local or cloud analytics system 312 or even the analytics system in the user device 400 recognizes when the cameras 103 are in ROI configuration mode and the image data is sent to the analytics systems. In step 520, the analytics system(s) interpret the detected sequence of images and define an associated electronic region of interest 82 in response.

In step 522, in response to "Stop" button 414-2 selection, the app 414 sends an instruction to the cameras 103 to signal end of ROI definition mode. According to step 524, the cameras 103 receive the stop instruction and save the electronic region of interest 82 to a buffer. Then, in step 526, one of the cameras sends its electronic region of interest 82 to the app 412 for verification by the operator 60.

In response, in step 527-1, the app 412 superimposes the received region of interest 82 upon the representative image data 250 of the scene, and renders an image of the resultant scene on the display screen 410. This allows the operator 60 to view and confirm placement of the region of interest 82 within the scene.

Then, in step 528, the app 412 presents user interface buttons "OK" 414-3 and "Cancel" 414-4 for the operator to accept or cancel the region of interest 82 definition, respectfully. Upon viewing the image, if the operator 60 determines that the region of interest 82 is acceptable, operator selects the "OK" button 414-3. According to step 530, in response to selection of the "OK" button 414-3, the app 414 sends an instruction to the cameras 103 and/or analytics system to accept the region of interest 82 definition. In response, in step 532, the cameras 103 and/or analytics systems store the electronic region of interest 82 by copying the electronic region of interest from the temporary buffer to its local device storage (e.g. camera image data storage system 174), for example.

Alternatively, if the operator 60 determines that the region of interest 82 is not acceptable, the operator selects the "Cancel" button 414-1 in step 534. In response, the app 412 sends a "cancel" instruction to the cameras 103 to cancel definition of the region of interest 82 and end ROI configuration mode. In response, in step 536, each camera 103 flushes the contents of the temporary' buffer to discard the currently defined electronic region of interest 82 and ends ROI config mode. Then, according to step 538, the operator 60 can repeat the definition of the region of interest 82 as required. For this purpose, control within the app passes to point "X" in the diagram to await selection of the START button 414-1 by the operator 60 to instruct the cameras 103 to re-enter ROI configuration mode to restart definition of the region of interest 82.

Finally, in step 540, the operator 60 selects the EXIT button 414-6, and the app 412 sends an instruction to the cameras 103 and/or analytics systems to exit ROI configuration mode and tear down the communications session 308 between the app 412 and the cameras 103.

The setup process described in this sequence diagram enables the definition of multiple regions of interest 82 across the participating cameras 103. Note that for each set of surveillance cameras 103 configured as part of this process, the electronic regions of interest 82 stored within each camera 103 can differ slightly across the cameras 103. This difference reflects the difference in perspective of the scene that each camera has.

Figure 5:
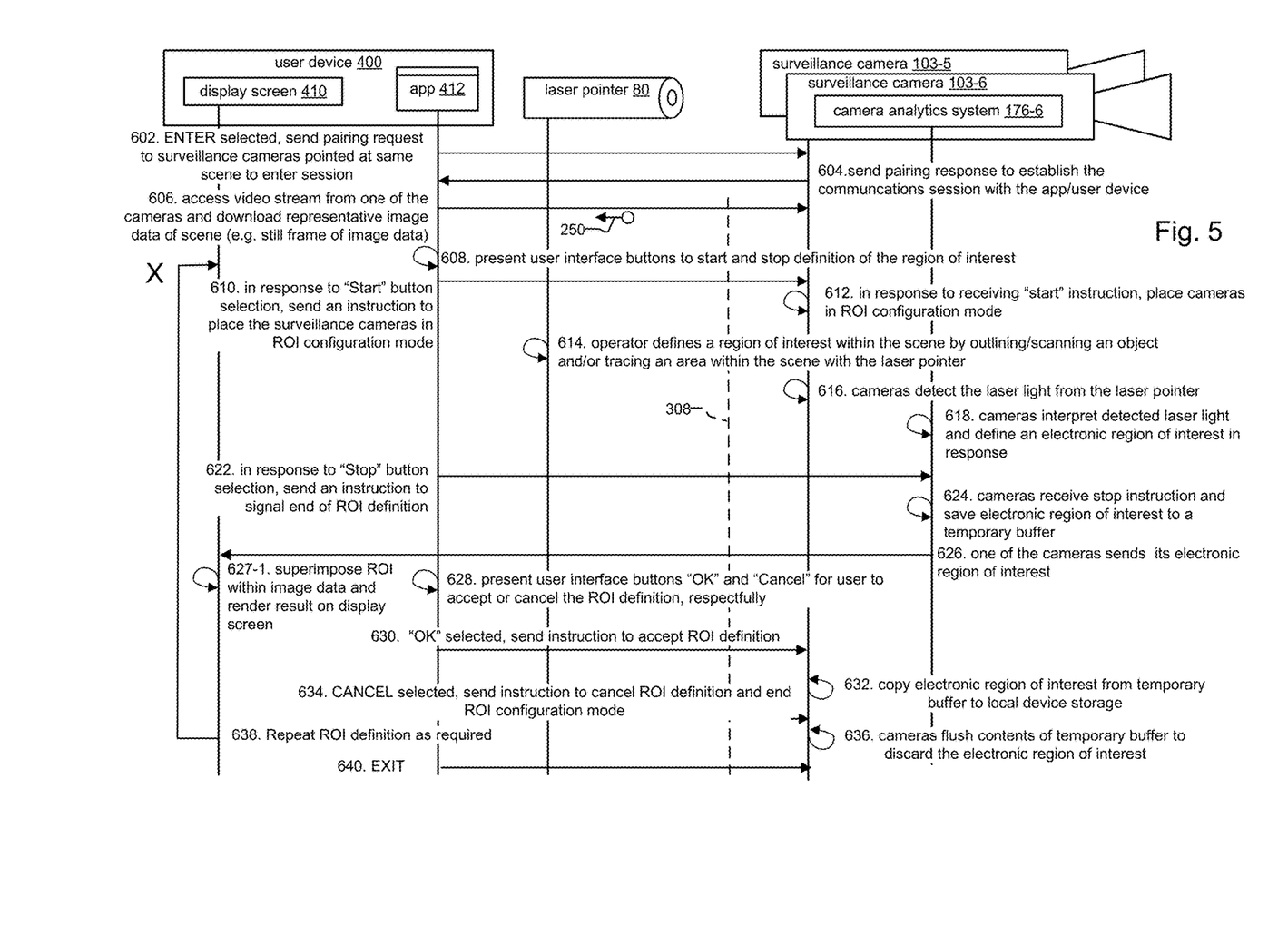
FIG. 5 is a sequence diagram that describes a second embodiment of a setup process enabling an installer to simultaneously designate regions of interest across multiple surveillance cameras that have overlapping fields of view, via a user device in conjunction with a laser pointing device.

FIG. 5 is a sequence diagram that describes a second embodiment of a setup process that enables an installer to simultaneously designate regions of interest 82 across multiple surveillance cameras 103. The setup process utilizes a user device 400 in conjunction with an optical device such as a laser pointer 80 to trace the regions of interest 82 within the scene or upon objects in the scene.

Steps 602, 604, 606, 608, for setup of the communications session 308 between the app 418 and the cameras 103, and for preparing the app 412 to signal start and stop of the definition of the region of interest 82, are identical to the functionality provided by steps 602, 604, 606, and 608 of FIG. 4, respectively. In a similar vein, steps 610 and 612 for enabling the cameras 103 and/or analytics systems to enter ROI configuration mode are identical to the functionality provided by steps 510 and 512 in FIG. 4, respectively.

In step 614, the operator 60 defines a region of interest 82 within the scene by outlining/scanning an object and/or tracing an area within the scene with the laser pointer 80. The cameras 103 and/or analytics systems detect the light from the laser pointer 80 in step 616, and interpret the detected light and define an electronic region of interest 82 in response in step 618.

Steps 622, 624, 626, 627-1, and 628 for saving a temporary copy of the electronic region of interest within each camera 103 and presenting it for operator verification on the display screen 410 of the user device 400 are identical to the functionality provided by steps 522, 524, 526, 527-1, and 528 of FIG. 4, respectively.

In a similar fashion, steps 630, 632, 634, 636, 638, and 640 for accepting or rejecting the definition of the region of the interest 82, storing the region of interest 82 upon acceptance, and exiting the setup process are identical to the functionality provided by steps 530, 532, 534,536, 538, and 540 of FIG. 4, respectively.

Figure 6:
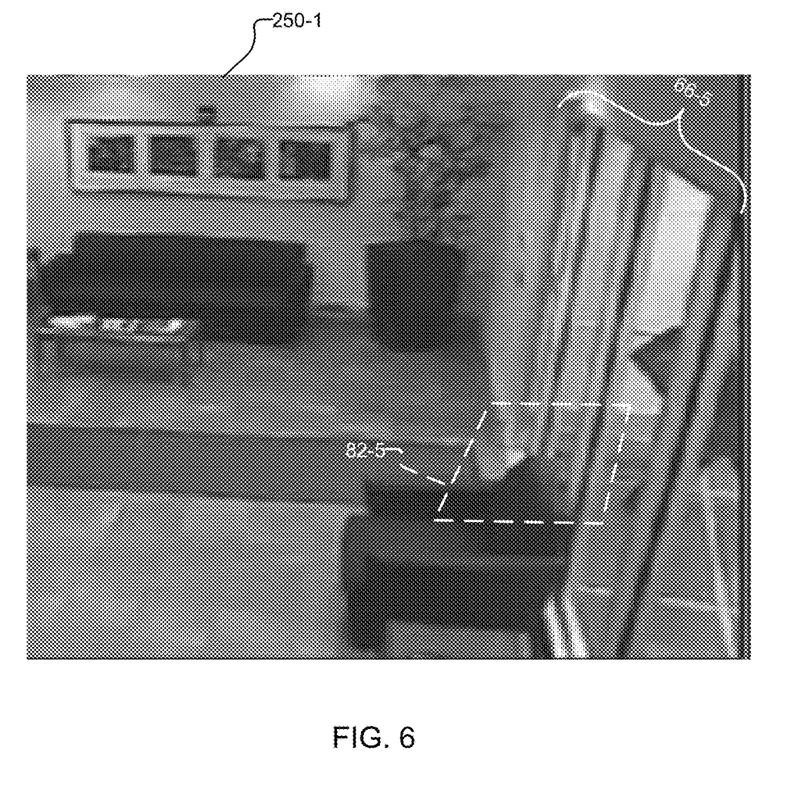
FIG. 6 shows an image representation of image data from a surveillance camera, where the image data includes regions of interest defined in accordance with either of the setup processes described in the sequence diagrams of FIG. 4 or FIG. 5.

FIG. 6 shows an image of an exemplary frame of image data 250-1 from a surveillance camera 103 that includes a defined region of interest 82-5 superimposed upon the image data 250-1. The image data 250-1 shows that the defined region of interest 82 can be associated with entry or exit areas between rooms, in one example. For this purpose, region of interest 82-5 is defined around a threshold of entryway 66-5. The image is what an operator might view within the display screen 410 of the user device 400 upon conclusion of step 527-1 for the setup process in FIG. 4 and/or upon conclusion of step 627-1 for the setup process in FIG. 5.

In other examples, regions of interest might correspond to point of sale terminals or product displays or thresholds of doors or areas around gaming tables or machines in casinos, to list a few examples.

Figure 7:
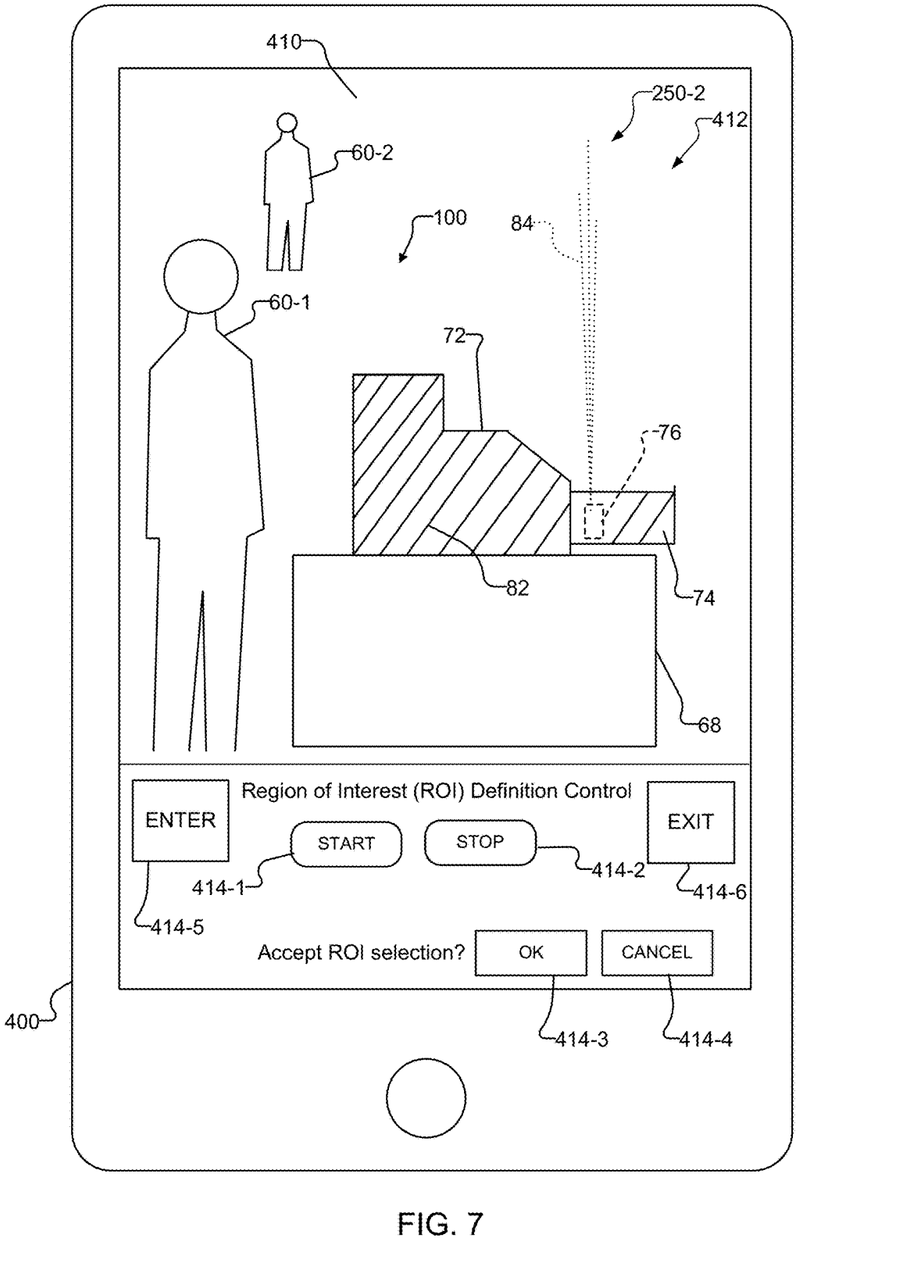
FIG. 7 is a schematic diagram of a user interface of an application displayed on the user device, where the application enables the definition of the regions of interest across the surveillance cameras, and where the application presents an image representation of the image data including the defined regions of interest for user acceptance in accordance with the process described in the sequence diagram of FIG. 5.

FIG. 7 shows an example user interface of the app 412 during setup of the region of interest 82 in accordance with the process described in the sequence diagram of FIG. 5, Within the user interface, buttons 414 are displayed that control the setup process for defining the regions of interest 82. The buttons 414 include ENTER 414-5, Start 414-1, Stop 414-2, OK 412-3, CANCEL 414-4, and EXIT 414-6 buttons. ENTER 414-5 and EXIT 415-6 signal the cameras 103 to enter and exit ROI configuration mode, respectively. Once within ROI configuration mode, Start 414-1 and Stop 414-2 buttons enable the start and completion of the definition of the region of interest 82. OK 414-3 and CANCEL 414-4 buttons enable the operator to accept (e.g. save to local storage) or cancel the definition of the region of interest 82.

In the illustrated example, the display screen 410 is presenting image data 250-2 that includes a superimposed region of interest 82 defined by one of the surveillance cameras 103. Users 60-1 and 60-2 are within the scene. The region of interest 82 is configured to highlight an area within the scene that coincides with point of sale terminal 72 within the scene.

Because the drawer 74 is opened, the normally hidden LED light 76 now emits its light beam 84, which the cameras 103 can detect. In one example, each of the LED lights deployed in the system 10 can be configured to modulate their light at different unique frequencies to provide a predetermined "identity stamp" upon detection of the light 84 by the surveillance cameras 84.

Figure 8:
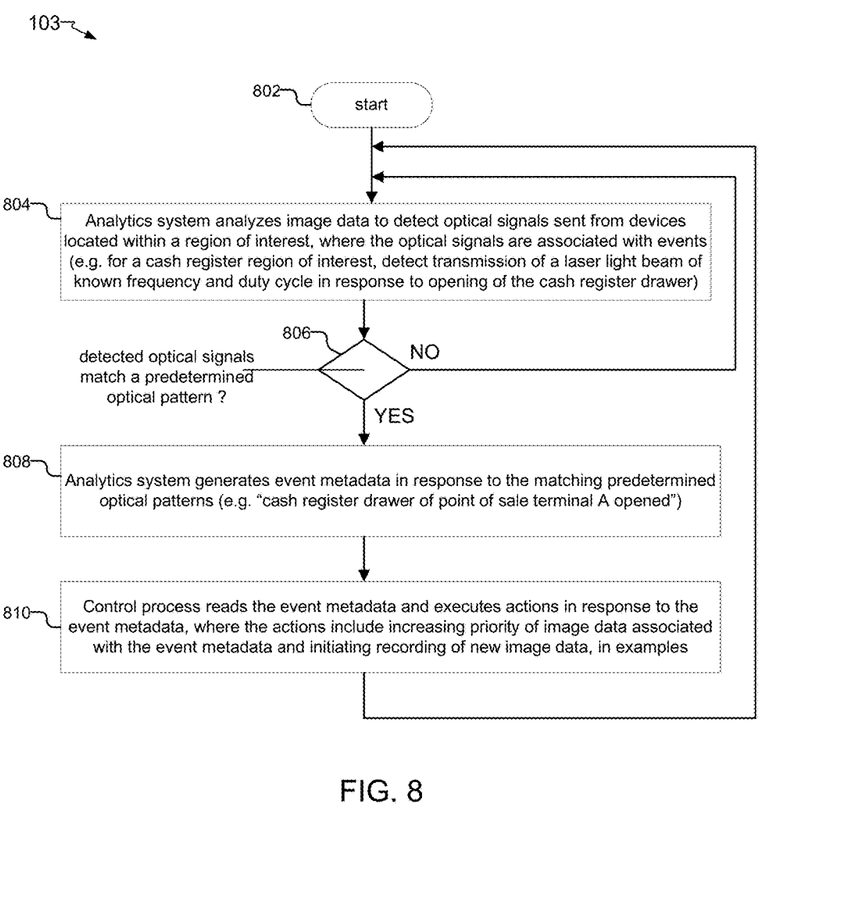
FIG. 8 is a flow diagram showing a process for analyzing optical signals sent from devices within the scene.

FIG. 8 shows a method for a surveillance camera and an analytics system integrated in the surveillance camera or a separate analytics system 312. According to the method, the camera 103 or a separate analytics system 312 monitors image data 250 of the scene to detect predetermined optical signals generated in the scene. In response to detecting the predetermined optical signals, the camera 103 or a separate analytics system 312 can then generate metadata associated with security events of interest and execute actions for the security events. The method starts at step 802.

In step 804, the camera analytics system 176 of the surveillance camera 103 or the separate analytics system 312 analyzes image data 250 of the scene to detect optical signals sent from devices located within a region of interest 82, where the optical signals are associated with events (e.g. for a cash register region of interest, detect transmission of a laser light beam of known frequency and duty cycle in response to opening of the cash register drawer). In one example, the device is the LED light 76, which emits optical signals via its light beam 84 when the drawer 74 is opened. In step 806, the camera analytics system 176 of the camera 103 or the separate analytics system 312 determines if the detected optical signals match a predetermined optical pattern and are coming from a predetermined area with in the scene captured by the camera. If this test resolves to true, the method transitions to step 808. Otherwise, the method transitions back to the beginning of step 804.

In step 808, the camera analytics system 174 or the separate analytics system 312 generates event metadata 160 in response to the matching predetermined optical patterns (e.g. "cash register drawer of point of sale terminal A opened. The camera analytics system 174 typically includes a time stamp within the event metadata 160 and stores the event metadata 160 to the camera image data storage system 174.

According to step 810, control process 162 reads the event metadata 160 and executes actions in response to the event metadata 160. In examples, the actions include increasing priority of image data 250 associated with the event metadata 160 and initiating recording of new image data 250.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of designating regions of interest in the fields of view of surveillance cameras and analyzing image data from the surveillance cameras, the method comprising:
designating the regions of interest by tracking a light spot projected into fields of view of the surveillance cameras by a laser pointer as the light spot is moved to thereby define the regions of interest;
capturing image data with the surveillance cameras; and
analyzing the image data for designation of regions of interest.

2. The method of claim 1, further comprising analyzing the image data from the surveillance cameras based on the regions of interest.

3. The method of claim 2, wherein analyzing the image data from the surveillance cameras based on the regions of interest comprises:
detecting predetermined optical patterns; and
generating metadata for the image data in response to detecting the predetermined optical patterns.

4. The method of claim 2, wherein analyzing the image data from the surveillance cameras based on the regions of interest comprises tracking movement of objects or persons relative to point of sale terminals or product displays or thresholds of doors or areas movement along streets or hallways.

5. The method of claim 1, further comprising analyzing the image data on analytics systems embedded in the surveillance cameras to determine the designated regions of interest.

6. The method of claim 1, further comprising analyzing the image data on external analytics systems to determine the designated regions of interest.

7. The method of claim 1, further comprising analyzing the image data on analytics systems executing on a portable computing device to determine the designated regions of interest.

8. A surveillance camera system, comprising:
one or more surveillance cameras capturing image data; and
an analytics system analyzing the image data for designation of regions of interest by tracking a light spot projected into fields of view of the surveillance cameras by a laser pointer as the light spot is moved to thereby define the regions of interest.

9. The system of claim 8, wherein the analytics system analyzes the image data from the surveillance cameras based on the regions of interest.

10. The system of claim 9, wherein analytics system detects predetermined optical patterns; and generating metadata for the image data in response to detecting the predetermined optical patterns.

11. The system of claim 9, wherein analytics system tracks movement of objects or persons relative to regions of interest corresponding to point of sale terminals or product displays or thresholds of doors or area of movement along streets or hallways.

12. The system of claim 8, wherein the analytics system is embedded in the surveillance cameras to determine the designated regions of interest.

13. The system of claim 8, wherein the analytics system is an external analytics system.

14. The system of claim 8, wherein the analytics system executes on a portable computing device to determine the designated regions of interest.

15. A method of designating regions of interest in the fields of view of surveillance cameras, the method comprising:

capturing image data with the surveillance cameras wherein the fields of view of the cameras are overlapping by tracking a light spot projected into fields of view of the surveillance cameras by a laser pointer as the light spot it is moved to thereby define the regions of interest; and analyzing the image data for designation of the same regions of interest in each of the different fields for different cameras simultaneously.

16. A surveillance camera system, comprising:

surveillance cameras capturing image data and having overlapping fields of view; and an analytics system analyzing the image data from the surveillance cameras for designation of regions of interest by tracking a light spot projected into fields of view of the surveillance cameras by a laser pointer as the light spot it is moved to thereby define the regions of interest.

* * * * *